(12) United States Patent
Ataka (10) Patent No.: US 8,081,325 B2
(45) Date of Patent: Dec. 20, 2011

(54) IMAGE FORMING APPARATUS (75) Inventor: Hiroyuki Ataka, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 1451 days.

(21) Appl. No.: 11/554,050

(22) Filed: Oct. 30, 2006

(65) Prior Publication Data
US 2007/0097404 A1    May 3, 2007

(30) Foreign Application Priority Data
Nov. 2, 2005  (JP) .................. 2005-319179

(51) Int. Cl.
G06F 15/00  (2006.01)
(52) U.S. Cl. ............ 358/1.13; 358/1.15; 358/1.18; 358/1.2; 358/1.9; 358/2.1
(58) Field of Classification Search ........... 358/1.13, 358/1.15, 1.18, 1.2, 1.9, 2.1
See application file for complete search history.

(56) References Cited

U.S. PATENT DOCUMENTS

| 6,374,065 | B1 | 4/2002 | Nishimura et al. | |
| 6,533,393 | B1* | 3/2003 | Meyer et al. | 347/43 |
| 2005/0185203 | A1 | 8/2005 | Oki | |
| 2005/0243126 | A1* | 11/2005 | Takahashi et al. | 347/40 |
| 2006/0039722 | A1* | 2/2006 | Ehara | 399/301 |
| 2006/0203256 | A1* | 9/2006 | Hagiwara | 358/1.1 |

FOREIGN PATENT DOCUMENTS

| JP | 02-235137 | 9/1990 |
| JP | 11-184318 | 7/1999 |
| JP | 2001-080135 | 3/2001 |
| JP | 2001-103318 | 4/2001 |
| JP | 2001-125334 | 5/2001 |
| JP | 2005-238788 | 9/2005 |
| JP | 2005-275378 | 10/2005 |

* cited by examiner

Primary Examiner — Mark K Zimmerman
Assistant Examiner — Mark Milia
(74) Attorney, Agent, or Firm — Renner, Otto, Boisselle & Sklar, LLP (57) ABSTRACT When sample printing is executed, whether the printing is executed putting higher priority on the printing speed than the image quality based on printing data of each page or the printing is executed putting higher priority on the image quality than the printing speed is automatically judged and the sample printing is executed based on the judgment result. When the sample printing is executed, for each page, an image quality priority degree judging portion 14a judges whether the printing is executed in a speed priority printing scheme that puts higher priority on the printing speed than the image quality in printing or the printing is executed in an image quality priority printing scheme that puts higher priority on the image quality than the printing speed in printing, a printing scheme switching portion 14b automatically switches the printing scheme according to the judgment result, and the sample printing is executed.

10 Claims, 8 Drawing Sheets

IMAGE FORMING APPARATUS

CROSS-NOTING PARAGRAPH

This Non-provisional application claims priority under 35 U.S.C. §119(a) on Patent Application No. 2005-319179 filed in JAPAN on Nov. 2, 2005, the entire contents of which are hereby incorporated herein by reference.

FIELD OF THE INVENTION

The present invention relates to an image forming apparatus having a printing controlling portion that switches its printing scheme between a speed priority printing scheme and an image quality priority printing scheme.

BACKGROUND OF THE INVENTION

Conventionally, for an image forming apparatus, when sample printing is executed to check the text configuration, the layout, etc., of the printing result, printing is executed always putting higher priority on the printing speed than the image quality as seen in, for example, Japanese Laid-Open Patent Publication No. H02(1990)-235137.

A method of executing sample printing executed for the case where color pages and monochrome pages are mixed can be a method according to which it is specified to print either color pages or monochrome pages at one time together and, thereby, the throughput is improved and the processing speed of the sample printing is increased as, for example, the invention described in Japanese Laid-Open Patent Publication No. 2001-103318.

However, according to the invention described in Japanese Laid-Open Patent Publication No. H02-235137, printing is executed according to a so-called "speed priority printing scheme" that increases the printing speed by degrading uniformly the image quality even when pages that are desired to be checked on the image quality thereof in high image quality is included in the sample printing and, therefore, a problem has arisen that, when pages that need to be checked on the image quality thereof are included, the check can not be executed.

According to the invention described in Japanese Laid-Open Patent Publication No. 2001-103318, though the throughput during the sample printing is improved, the processing speed is not increased so much compared to the speed priority printing scheme of printing with degraded image quality. However, when printing is executed in the speed priority printing scheme with uniformly degraded image quality admitting the above, a check on the image quality of color pages and pages with photos can not be executed.

SUMMARY OF THE INVENTION

The object of the invention is to provide an image forming apparatus with which a check on the image quality can be executed efficiently for sample printing and also for color pages and pages with photo images.

To achieve the above object, according to a major aspect of the present invention there is provided an image forming apparatus having a printing controlling portion that switches its printing scheme between a speed priority printing scheme and an image quality priority printing scheme, wherein the printing controlling portion comprises an image quality priority degree judging means that judges an image quality priority degree based on the contents of printing data of each page; and a printing scheme switching means that switches its printing scheme between the speed priority printing scheme and the image quality priority printing scheme for each page based on the judgment result of the image quality priority degree judging means.

In the image forming apparatus of the present invention, the image quality priority degree judging means may have a color ratio judging mode according to which the image quality priority degree judging means calculates a color ratio for each page and judges the image quality priority degree based on whether the color ratio is equal to or larger than, or smaller than a predetermined threshold value.

In the image forming apparatus of the present invention, the image quality priority degree judging means may have a command ratio judging mode according to which the image quality priority degree judging means calculates an image command ratio for each page and judges the image quality priority degree based on whether the image command ratio is equal to or larger than, or smaller than a predetermined threshold value.

In the image forming apparatus of the present invention, the image quality priority degree judging means may have a printing data amount judging mode according to which the image quality priority degree judging means calculates a printing data amount for each page and judges the image quality priority degree based on whether the printing data amount is equal to or larger than, or smaller than a predetermined threshold value.

The image forming apparatus of the present invention may comprise a setting means that specifies the predetermined threshold values.

The image forming apparatus of the present invention may comprise a setting means that specifies in advance a monochrome printing mode as a printing mode for the case where the speed priority printing scheme is selected as a result of a judging process by the image quality priority degree judging means.

The image forming apparatus of the present invention may comprise a setting means that specifies in advance a color printing mode as a printing mode for the case where the speed priority printing scheme is selected as a result of a judging process by the image quality priority degree judging means.

The image forming apparatus of the present invention may comprise a setting means that specifies whether the judging process by the image quality priority degree judging means is executed.

PREFERRED EMBODIMENTS OF THE INVENTION

First Embodiment

Figure 1:
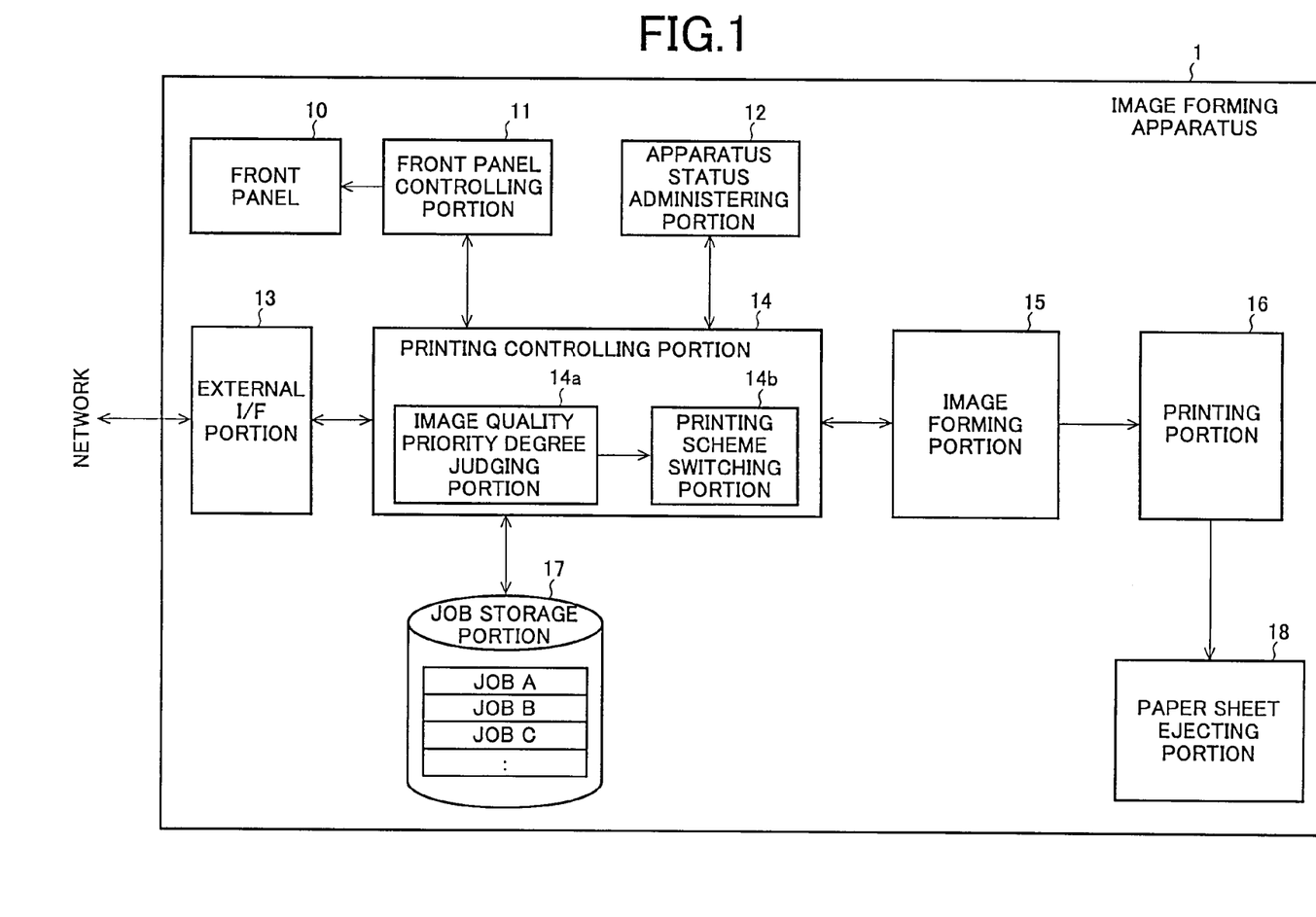
FIG. 1 is a schematic block diagram of the configuration of the main part to describe an embodiment of an image forming apparatus having a printing controlling portion according to the present invention.

FIG. 1 is a schematic block diagram of the configuration of the main part to describe an embodiment of an image forming apparatus having a printing controlling portion according to the present invention. In FIG. 1, 1 denotes the image forming apparatus having the printing controlling portion according to the present invention. The image forming apparatus 1 includes a front panel 10 to execute various types of displays that show statuses of the apparatus, an execution operation of ordinary printing or sample printing and various types of setting operations and, in addition, a setting operation to set a mode of a judging method and a setting operation to specify whether an image quality priority judging process is executed for the case where the image quality priority degree of a page is judged; a front panel controlling portion 11 that transmits to a printing controlling portion 14 an operating signal corresponding to display control of the front panel 10 and to operation of a user; an apparatus status administering portion 12 that administers the status of the image forming apparatus 1 and, when an error or a paper jam has occurred, notifies the front panel 10 of the error or the jam; an external I/F portion 13 having an interface portion to connect an external network to the image forming apparatus (multi-functional machine) 1; the printing controlling portion 14 that interprets a page description language; instructs an image forming portion 15 to form a printing image, and, in addition, executes various types of printing control described later; the image forming portion 15 that forms a printing image based on printing data from the printing controlling portion 14; a printing portion 16 that prints an image (printing image) formed by the image forming portion 15 on a paper medium; a printing job storing portion 17 that stores a printing job; a paper sheet ejecting portion 18 that ejects printed paper sheets, etc. The printing controlling portion 14 has an image quality priority degree judging portion 14a that in the sample printing, judges based on the printing data whether printing is executed in a speed priority printing scheme according to which printing is executed putting higher priority on speed than on image quality or in an image quality priority printing scheme according to which printing is executed putting higher priority on image quality than on speed, and a printing scheme switching portion 14b that switches the printing scheme between the speed priority scheme and the image quality priority scheme based on the judgment result of the image priority degree judging portion 14a.

The image quality priority degree judging portion 14a has a color ratio (a ratio of the area of the portion to be color printed and the portion to be monochrome printed in a printed page) judging mode according to which image quality priority degree judgment is executed referring to the color ratio of a page, a command ratio judging mode according to which the judgment is executed referring to the image command ratio, and a data amount judging mode according to which the judgment is executed referring to the printing data amount, as a method of judging an image quality priority degree. A user specifies which judging mode is employed by pressing a button on the front panel 10 displayed on the front panel prior to execution of the sample printing.

Description will be given for the image priority degree judging method that is a feature of the present invention. In the color ratio judging mode, the color ratio of a page to be printed is calculated from the printing data of the page and judges the image quality priority degree based on whether the calculated color ratio is equal to or larger than, or less than a predetermined threshold value. The details of the color ratio calculation method is described in Japanese Laid-Open Patent Publication No. 2005-238788. A page having a higher color ratio than a monochrome ratio is often a page to be printed putting priority on the image quality rather than increasing the printing speed by degrading the resolution, etc. Therefore, when such a page is printed, sample printing is executed without degrading the image quality. Thereby, a page having higher color ratio can be checked for the printing result thereof without degrading the printing image quality thereof.

In the command ratio judging mode, the ratio of the number of image commands occupying to the number of all the printing commands as to a page to be printed is calculated and the image quality priority degree is judged based on whether the calculated ratio is equal to or larger than, or smaller than a predetermined threshold value. In this judging mode, the number of image commands or the number of the graphic commands of the page to be printed may be calculated and the judgment may be executed based on the calculated number of image commands or graphic commands is equal to or larger than, or smaller than a predetermined threshold value. Otherwise, the ratio of the number of image commands and graphic commands to the number of character printing commands may be calculated. The point is that a page having the ratio of image commands to all the printing commands as to the page to be printed that is larger than a predetermined threshold value is often a page to be printed putting priority on the image quality rather than increasing printing speed by degrading the resolution, etc., and, therefore, when such a page is printed, sample printing is executed without degrading the image quality. Thereby, a page having a high ratio of the number of image commands to the number of all the printing commands can be checked for the printing result thereof without degrading the printing image quality thereof.

In the data amount judging mode, a data amount of the page to be printed (a printing data amount) is calculated from the printing data of the page and the image quality priority degree is judged based on whether the calculated printing data amount is equal to or larger than, or smaller than a predetermined threshold value. A page having a large printing data amount is often a page to be printed putting priority on the image quality rather than increasing the printing speed by degrading the resolution thereof, etc., (because the page contains photo images, etc., that have a large amount of printing data) and, therefore, when such a page is printed, sample printing is executed without degrading the image quality. Thereby, a page having a large amount of printing data can be checked for the printing result thereof without degrading the printing image quality thereof.

Figure 2A:
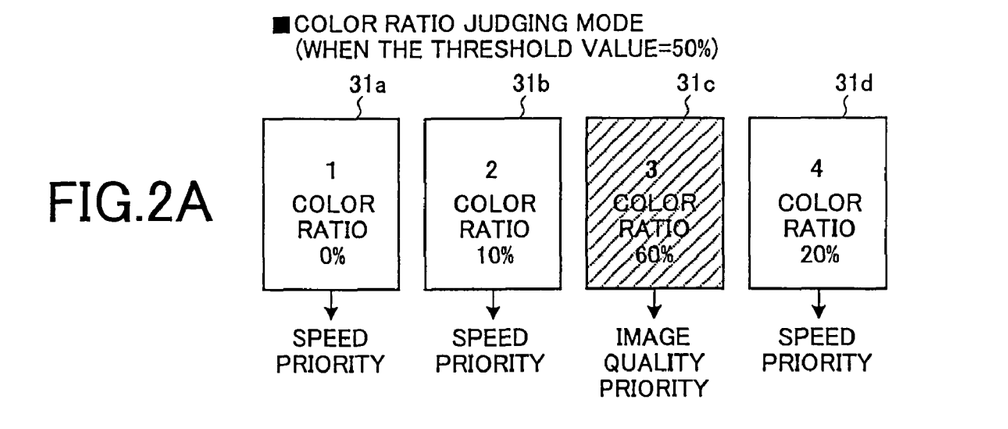
FIGS. 2A to 2C are detailed explanatory views of a judging mode.
Figure 2B:
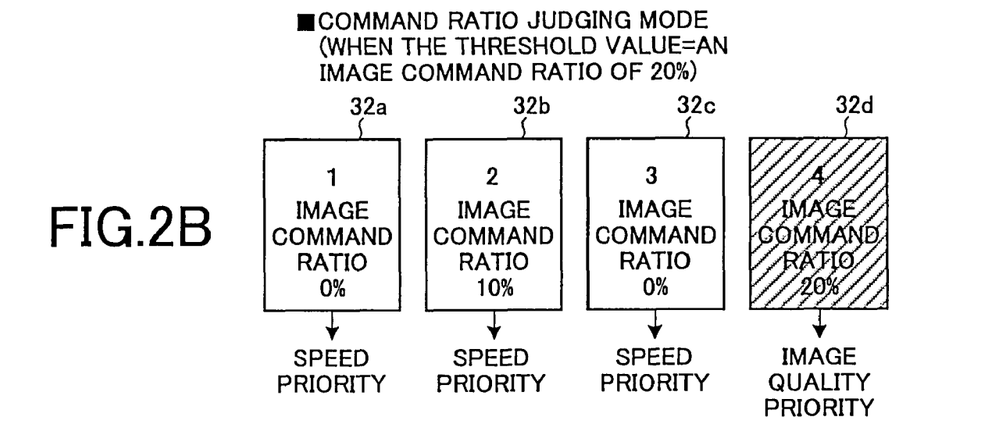
Figure 2C:
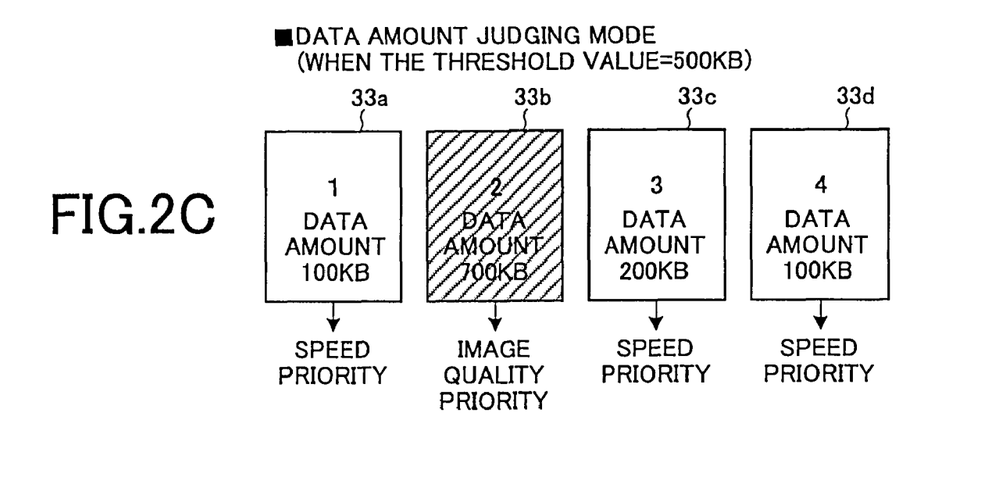

FIGS. 2A to 2C are detailed explanatory views respectively of the judging modes (the color ratio judging mode, the command ratio judging mode, and the data amount judging mode).

FIG. 2A depicts an example of the case where the color ratio judging mode is specified and the threshold value of the color ratio is set to 50%. Pages to be printed 31a, 31b, and 31d respectively have the color ratios of 0% (a monochrome page), 10%, and 20% that are all smaller than the threshold value (50%) and, therefore, the pages 31a, 31b, and 31d are all judged to be speed priority pages. A page to be printed 31c has the color ratio of 60% that is larger than the threshold value (50%) and, therefore, the page 31c is judged to be an image quality priority page.

FIG. 2B depicts an example of the case where the command ratio judging mode is specified and the threshold value of the image command ratio is set to 20%. Pages to be printed 32a, 32b, and 32c respectively have the image command ratios of 0%, 10%, and 0% that are all smaller than the threshold value (20%) and, therefore, the pages 32a, 32b, and 32c are all judged to be speed priority pages. A page to be printed 32d has the image command ratio of 20% that is equal to or larger than the threshold value (20%) and, therefore, the page 32d is judged to be an image quality priority page.

FIG. 2C depicts an example of the case where the data amount judging mode is specified and the threshold value of the data amount is set to 500 KB. Pages to be printed 33a, 33c, and 33d respectively have the data amounts of the pages to be printed of 100 KB, 200 KB, and 100 KB that are all smaller than the threshold value (500 KB) and, therefore, the pages 33a, 33c, and 33d are all judged to be speed priority pages. A page to be printed 33b has the data amount of 700 KB that is larger than the threshold value (500 KB) and, therefore, the page 33d is judged to be an image quality priority page.

Figure 3:
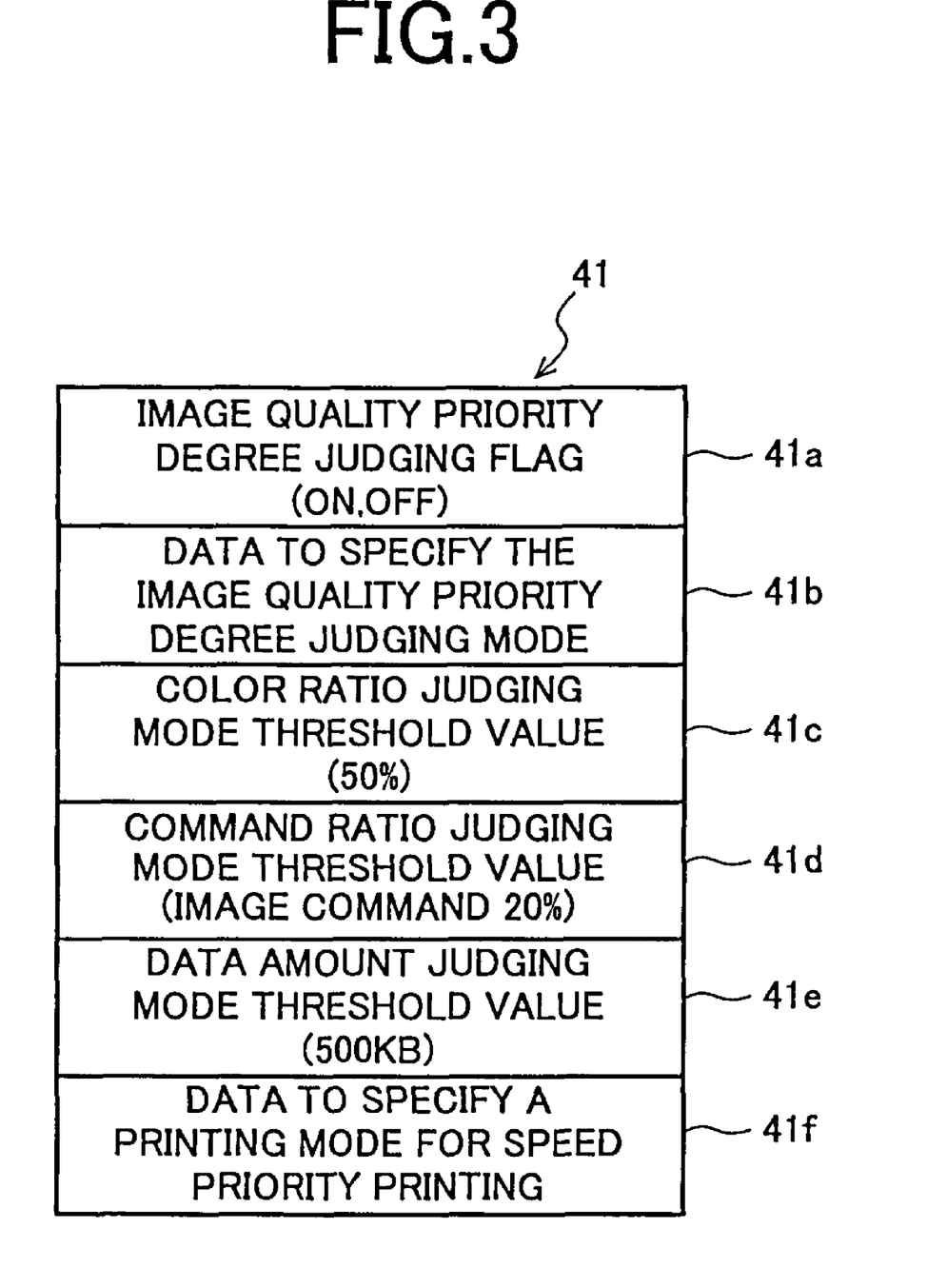
FIG. 3 is an explanatory view of various settings.

FIG. 3 is an explanatory view of various settings for executing sample printing of the present invention. A data file 41 records data (values) corresponding to various operations from the front panel 10 such as an image quality priority degree judging flag 41a, data 41b to specify the image quality priority degree judging mode, a color ratio judging mode threshold value 41c, a command ratio judging mode threshold value 41d, a data amount judging mode threshold value 41e, data 41f to specify a printing mode for speed priority printing.

The image quality priority degree judging flag 41a is referred to to judge whether a judging process by the image quality priority degree judging portion 14a is executed for sample printing and, when the image quality priority degree judging flag 41a is ON, the judging process by the image quality priority degree judging portion is executed. The data 41b to specify the image quality priority degree judging mode is referred to when which mode of the color ratio judging mode, the command ratio judging mode, and the data amount judging mode is specified for the image quality priority degree judging process.

The color ratio judging mode threshold value 41c, the command ratio judging mode threshold value 41d, and the data amount judging mode threshold value 41e are threshold values that are referred to to execute the judging process. The data 41f to specify a printing mode for speed priority printing is referred to to determine which of a monochrome printing mode according to which monochrome printing is executed degrading the resolution and a color printing mode according to which color printing is executed degrading the resolution is employed to execute the speed priority printing scheme.

Figure 4:
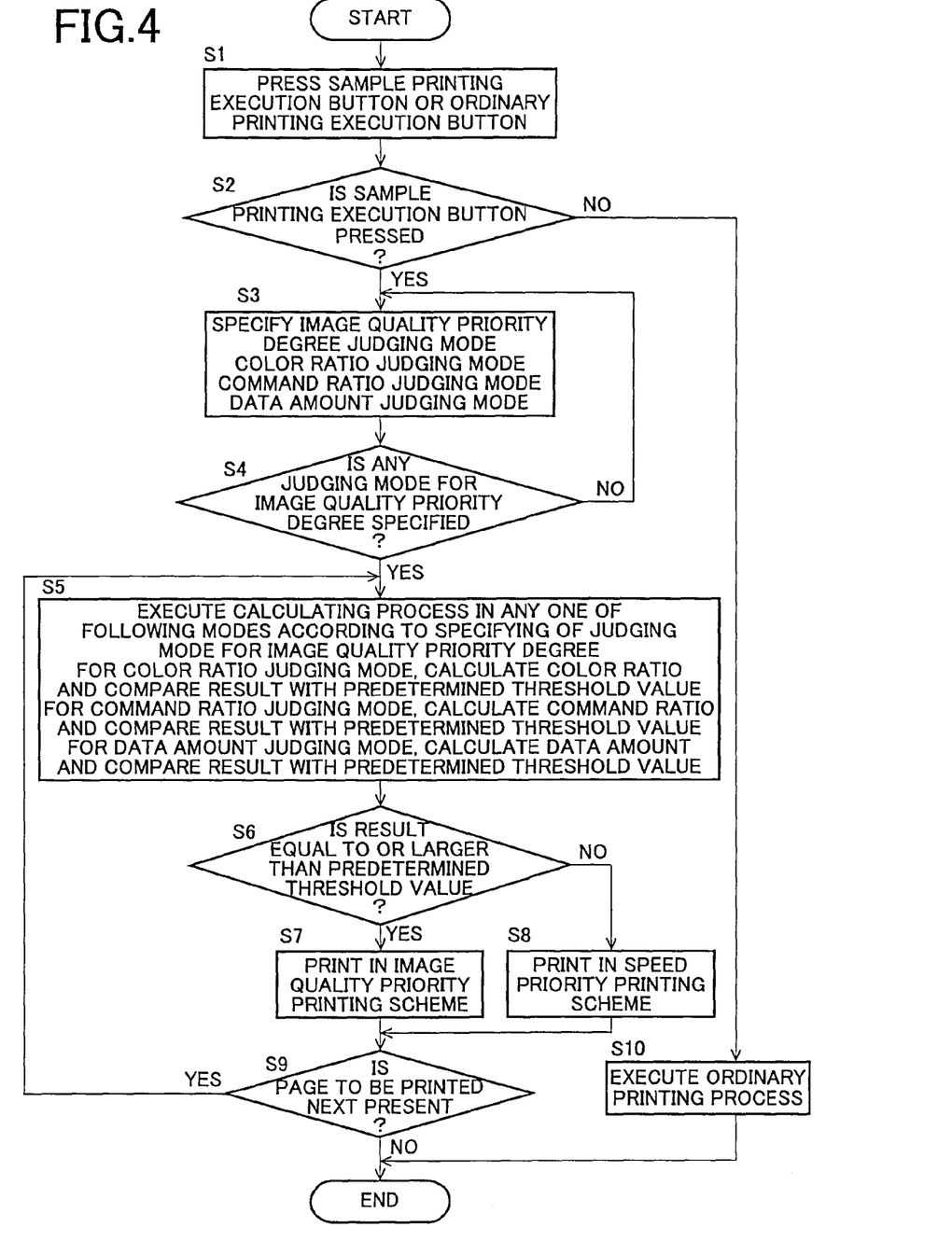
FIG. 4 is an explanatory flowchart of a first embodiment.

FIG. 4 is an explanatory flowchart of the basic operation for executing sample printing according to the present invention. When a button of execution of the sample printing or execution of ordinary printing is pressed on the front panel (step S1), which execution button is pressed is judged (step S2). When the execution button of the sample printing is pressed (YES at step S2), a user specifies any one of the color ratio judging mode, the command ratio judging mode, and the data amount judging mode (step S3). When the execution button of the ordinary printing is pressed (NO at step S2), an ordinary printing process is executed (step S10).

When the user specifies an image quality priority degree judging mode (the color ratio judging mode, the command ratio judging mode, or the data amount judging mode) (YES at step S4), an image quality priority degree judging process is executed corresponding to the specified judging mode (step S5). In the image quality priority degree judging process, when the user specifies the color ratio judging mode, the color ratio of a page to be printed is calculated and the calculated color ratio value is compared with the color ratio judging mode threshold value. When the user specifies the command ratio judging mode, the image command ratio of a page to be printed is calculated and the calculated image command ratio value is compared with the command ratio judging mode threshold value. When the user specifies the data amount judging mode, the data amount of a page to be printed is calculated and the calculated data amount value is compared with the data amount judging mode threshold value.

As a result of the judgment, when the value is equal to or larger than the threshold value (YES at step S6), sample printing is executed in the image quality priority scheme (step S7) and, when the value is smaller than the threshold value (NO at step S6), the sample printing is executed in the speed priority printing scheme (step S8). When printing of one page is finished, whether a page to be printed next is present is judged (step S9) and, when the page to be printed next is present (YES at step S9), the processes at step S5 and later are executed. When no page to be printed is present (NO at step S9), the sample printing process is ended.

In the embodiment, whether printing is executed putting priority on the image quality or decreasing the printing speed can be automatically judged for each page to be printed. Therefore, when a page that is desired to be checked for the image quality thereof is printed, the printing is executed putting priority on the image quality and, when a page is printed that gives no adverse influence on checking of the configuration and the layout of the paper space thereof even when the page is printed with degraded image quality, the printing speed can be increased by printing the page putting priority on the speed. By printing with degraded image quality, not only that the printing speed can be increased but also that the amount of toner used for the printing can be reduced. Therefore, the cost of the sample printing can also be reduced.

In the embodiment, the sample printing is specified using an execution button on the front panel. However, the present invention may be implemented such that, when the printing is executed from a printer driver on a PC, the sample printing is specified and a sample printing specifying command is outputted from the printer driver and, thereby, the sample printing is specified from the printer driver.

The present invention may be implemented such that the specifying of the judging mode is able to be set before not after pressing a button of execution of the sample printing and the judging mode also is able to be specified from the printer driver.

Second Embodiment

According to a second embodiment, a monochrome mode with degraded resolution can be specified as a printing mode employed when the sample printing is executed in the speed priority printing scheme.

Figure 5:
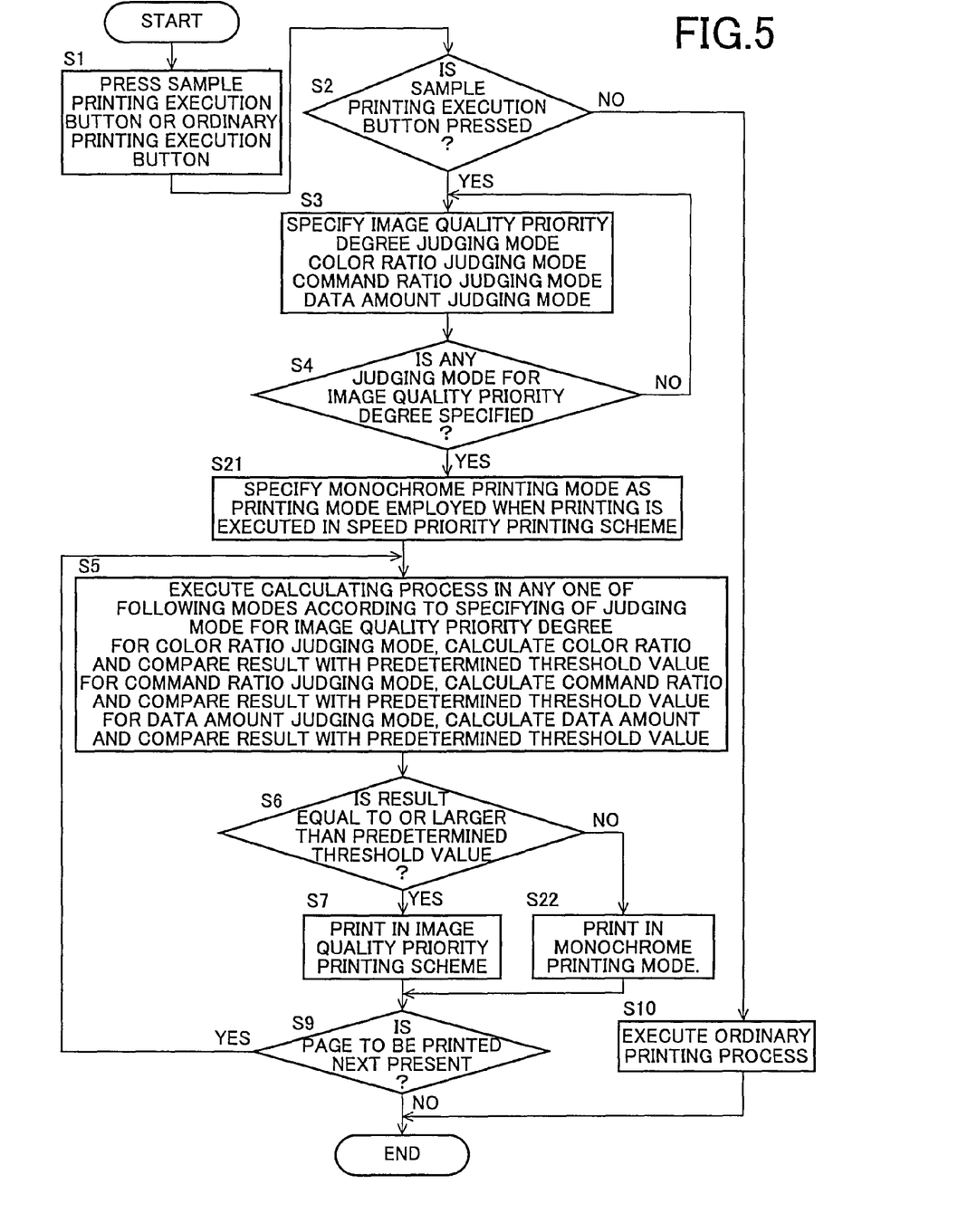
FIG. 5 is an explanatory flowchart of a second embodiment.

FIG. 5 is an explanatory flowchart of the embodiment. A specifying operation is executed to specify a judging mode in the image quality priority degree judging process (steps S3 and S4). A printing mode employed when it is judged in the image quality priority degree judging process that the printing is executed in the speed priority printing scheme is specified as the monochrome printing mode (step S21) and the processes at step S5 and later are executed. When it is judged in the image quality priority degree judging process that printing is executed in the speed priority printing scheme (NO at step S6), the sample printing is executed in the monochrome printing mode with degraded resolution (step S22).

Other operations are same as those in the case of FIG. 4 and the description thereof is omitted.

According to the embodiment, in the case where even a color portion is contained in a page to be printed, when the percentage thereof is small, the printing speed of the sample printing can be improved and the cost can be reduced by printing in the monochrome mode.

In this case, similarly to the specifying of the sample printing, the present invention may be implemented such that, when the printing is executed from a printer driver on a PC, the monochrome mode is specified as the printing mode of the sample printing and a printing mode specifying command of the sample printing is outputted from the printer driver and, thereby, the sample printing is specified from the printer driver.

Third Embodiment

According to a third embodiment, a color mode of speed priority (with degraded resolution, without depth of color) can be specified as a printing mode employed when the sample printing is executed in the speed priority printing scheme.

Figure 6:
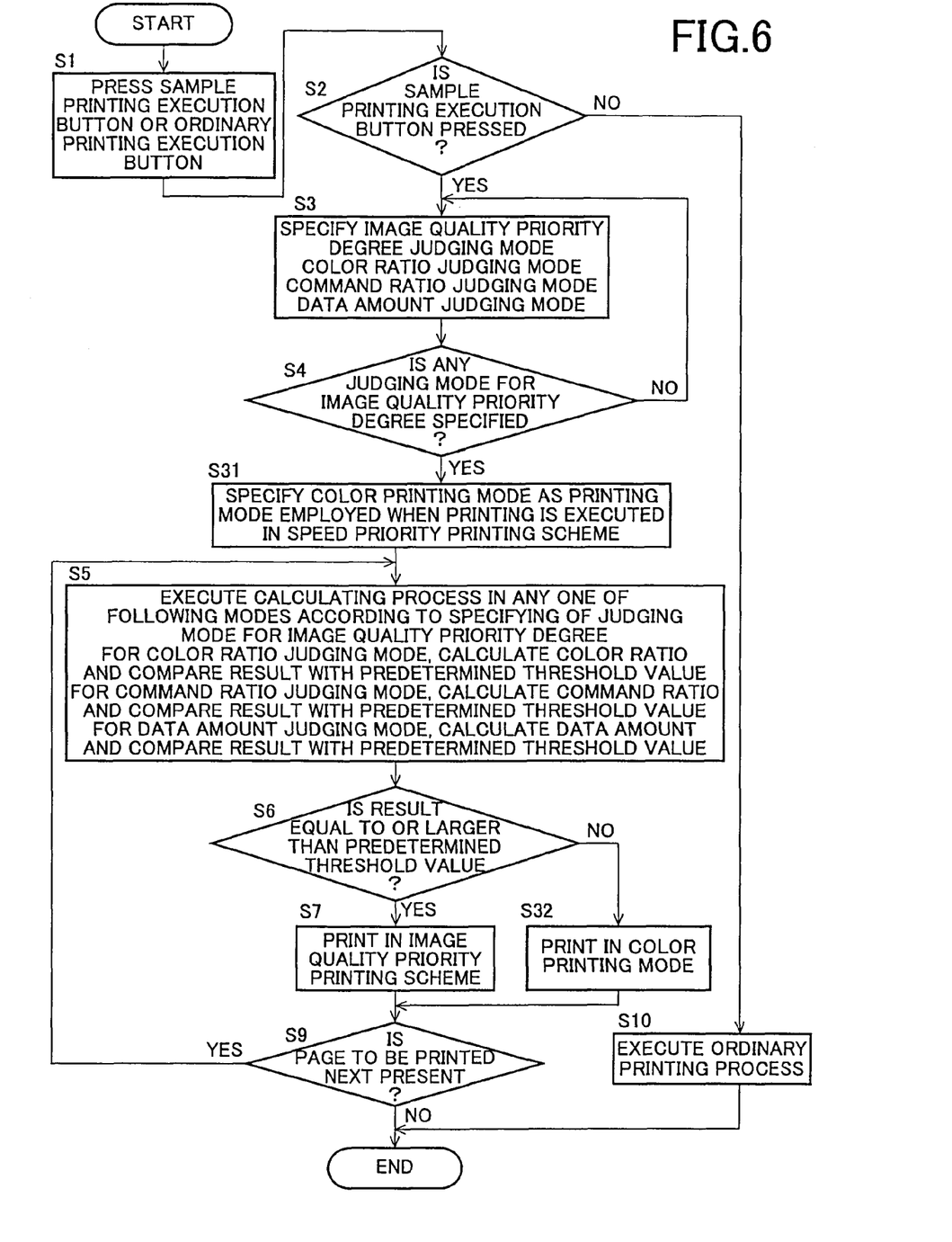
FIG. 6 is an explanatory flowchart of a third embodiment.

FIG. 6 is an explanatory flowchart of the embodiment. A specifying operation is executed to specify a judging mode in the image quality priority degree judging process (steps S3 and S4). A printing mode employed when it is judged in the image quality priority degree judging process that the printing is executed in the speed priority printing scheme is specified as the color printing mode (step S31) and the processes at step S5 and later are executed. When it is judged in the image quality priority degree judging process that printing is executed in the speed priority printing scheme (NO at step S6), the sample printing is executed in the color printing mode of speed priority (with degraded resolution, without depth of color) (step S32).

Other operations are same as those in the case of FIG. 4 and the description thereof is omitted.

According to the embodiment, even when a color page is printed in the speed priority printing scheme, the page is printed without changing the color tone (the color shade) and, therefore, the color tone (the color shade) of the printed image can be checked.

In this case, similarly to the specifying of the sample printing, the present invention may be implemented such that, when the printing is executed from a printer driver on a PC, the color mode is specified as the printing mode of the sample printing and a printing mode specifying command of the sample printing is outputted from the printer driver and, thereby, the sample printing is specified from the printer driver.

Fourth Embodiment

According to a fourth embodiment, whether the image quality priority degree judging process is executed can be selected.

Figure 7:
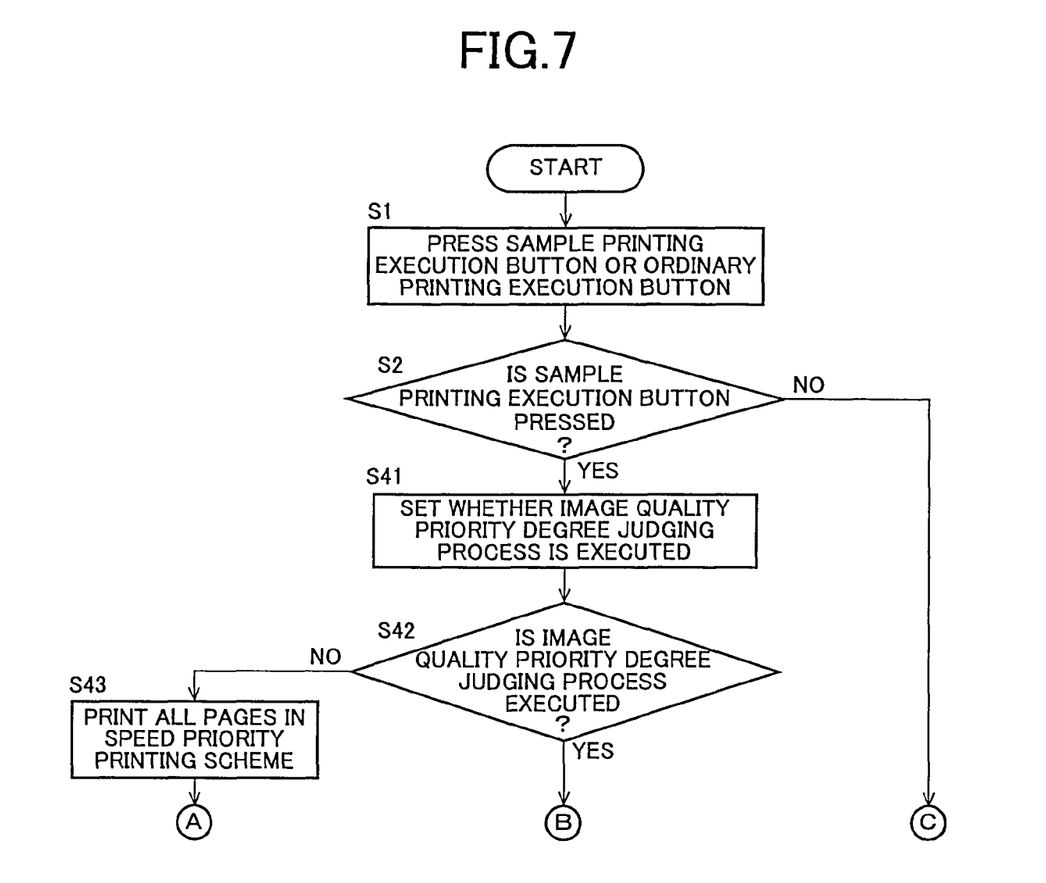
FIG. 7 is a part of preceding explanatory flowchart of a fourth embodiment.
Figure 8:
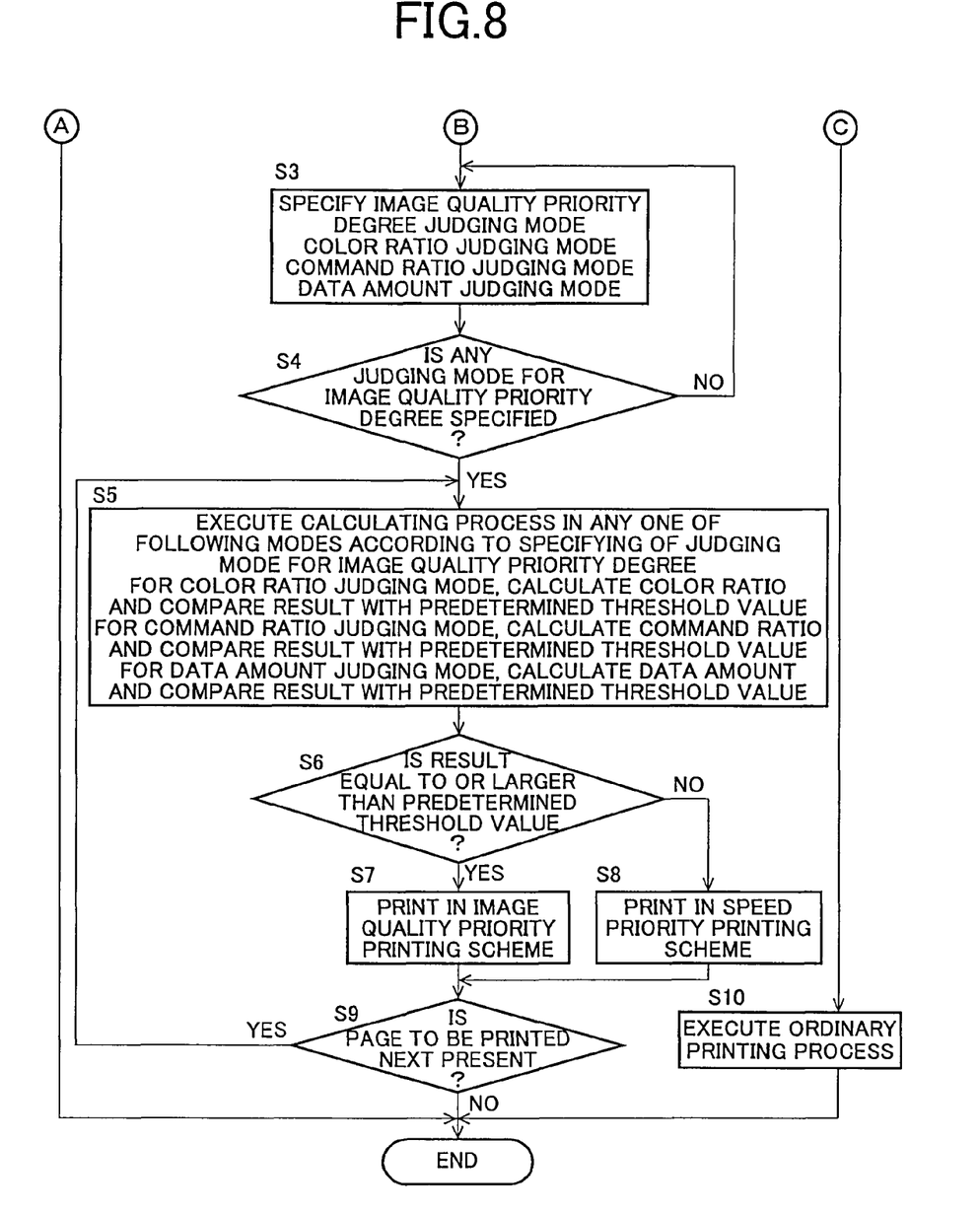
FIG. 8 is a part of following explanatory flowchart of a fourth embodiment.

FIG. 7 and FIG. 8 are explanatory flowcharts of the embodiment. After a user presses a sample printing execution button (YES at step S2), whether the image quality priority degree judging process is executed is set (step S41). When the image quality priority degree judging process is executed and the sample printing is executed (YES at step S42), the processes at step S3 and later are executed. When the image quality priority degree judging process is executed and no sample printing is executed (NO at step S42), all pages are printed in the speed priority printing scheme (printed with degraded resolution) (step S43).

Other operations are same as those in the case of FIG. 4 and the description thereof is omitted.

According to the embodiment, when the user desires to print at an increased printing speed by printing all pages uniformly with degraded resolution in the case where a document including only characters is printed, etc., sample printing can be executed executing the image quality priority degree judging process not for each page.

In this case, similarly to the specifying of the sample printing, the present invention may be implemented such that, when the printing is executed from a printer driver on a PC, whether the image quality priority degree judging process is executed and the sample printing is executed is specified and an image quality priority degree judging process execution specifying command is outputted from the printer driver and, thereby, the sample printing is specified from the printer driver.

The present invention may be implemented to set before whether or not to execute the image quality priority degree judging process previously.

As above, according to the present invention, when sample printing is executed, a page can be printed in a printing scheme suitable for the page based on the contents of printing data of each page. Therefore, the sample printing can be executed efficiently and the image quality of a page for which the image quality thereof in addition to the text configuration and the layout thereof is desired to be checked can be checked without degrading the image of quality.

What invention claimed is:

1. An image forming apparatus having a printing controlling portion that switches printing scheme between a speed priority printing scheme and an image quality priority printing scheme, wherein
the printing controlling portion comprises:
an image quality priority degree judging means that judges an image quality priority degree based on the contents of printing data of each page when sample printing is executed; and
a printing scheme switching means that switches its printing scheme between the speed priority printing scheme and the image quality priority printing scheme for each page based on the judgment result for each page of the image quality priority degree judging means,
the image quality priority degree judging means including:
a color ratio judging mode according to which the image quality priority degree judging means calculates a color ratio for each page and judges the image quality priority degree based on whether the color ratio is equal to or larger than, or smaller than a predetermined threshold value;
a command ratio judging mode according to which the image quality priority degree judging means calculates a command ratio that is a ratio of the number of image commands occupying to the number of all the printing commands as to a page to be printed for each page and judges the image quality priority degree based on whether the command ratio is equal to or larger than, or smaller than a predetermined threshold value; and
a printing data amount judging mode according to which the image quality priority degree judging means calculates a printing data amount for each page and judges the image quality priority degree based on whether the printing data amount is equal to or larger than, or smaller than a predetermined threshold value; and
the image forming apparatus has a mode setting means that specifies any one of judging modes including the color ratio judging mode, the command ratio judging mode, and the printing data amount judging mode.

2. The image forming apparatus of claim 1, comprising:
a setting means that specifies the predetermined threshold values.

3. The image forming apparatus of claim 1, comprising:
a setting means that specifies in advance a monochrome printing mode as a printing mode for the case where the speed priority printing scheme is selected as a result of a judging process by the image quality priority degree judging means.

4. The image forming apparatus of claim 1, comprising:
a setting means that specifies in advance a color printing mode as a printing mode for the case where the speed priority printing scheme is selected as a result of a judging process by the image quality priority degree judging means.

5. The image forming apparatus of claim 1, comprising:
a setting means that specifies whether the judging process by the image quality priority degree judging means is executed.

6. The image forming apparatus of claim 2, comprising:
a setting means that specifies in advance a monochrome printing mode as a printing mode for the case where the speed priority printing scheme is selected as a result of a judging process by the image quality priority degree judging means.

7. The image forming apparatus of claim 2, comprising:
a setting means that specifies in advance a color printing mode as a printing mode for the case where the speed priority printing scheme is selected as a result of a judging process by the image quality priority degree judging means.

8. The image forming apparatus of claim 2, comprising:
a setting means that specifies whether the judging process by the image quality priority degree judging means is executed.

9. The image forming apparatus of claim 3, comprising:
a setting means that specifies whether the judging process by the image quality priority degree judging means is executed.

10. The image forming apparatus of claim 4, comprising:
a setting means that specifies whether the judging process by the image quality priority degree judging means is executed.

\* \* \* \* \*